(12) United States Patent
Jentzsch et al.

(10) Patent No.: US 12,506,323 B2
(45) Date of Patent: Dec. 23, 2025

(54) SEMICONDUCTOR LASER WITH A HORIZONTAL LASER ELEMENT AND A VERTICAL LASER ELEMENT, LIDAR SYSTEM AND PRODUCTION METHOD

(71) Applicant: ams-OSRAM International GmbH, Regensburg (DE)

(72) Inventors: Bruno Jentzsch, Regensburg (DE); Hubert Halbritter, Dietfurt-Toeging (DE)

(73) Assignee: AMS-OSRAM INTERNATIONAL GMBH, Regensburg (DE)

( * ) Notice: Subject to any disclaimer, the term of this patent is extended or adjusted under 35 U.S.C. 154(b) by 566 days.

(21) Appl. No.: 17/926,876

(22) PCT Filed: May 4, 2021

(86) PCT No.: PCT/EP2021/061694
§ 371 (c)(1),
(2) Date: Nov. 21, 2022

(87) PCT Pub. No.: WO2021/239407
PCT Pub. Date: Dec. 2, 2021

(65) Prior Publication Data
US 2023/0231362 A1 Jul. 20, 2023

(30) Foreign Application Priority Data
May 26, 2020 (DE) ............. 10 2020 206 580.2

(51) Int. Cl.
*H01S 5/18* (2021.01)
*H01S 5/02255* (2021.01)
(Continued)

(52) U.S. Cl.
CPC ............ *H01S 5/18* (2013.01); *H01S 5/02255* (2021.01); *H01S 5/026* (2013.01); *H01S 5/1021* (2013.01);
(Continued)

(58) Field of Classification Search
CPC ........ H01S 5/18; H01S 5/02255; H01S 5/026; H01S 5/1021; H01S 5/18305; H01S 5/185; H01S 5/423
See application file for complete search history.

(56) References Cited

U.S. PATENT DOCUMENTS 4,633,476 A * 12/1986 Scifres ................. B82Y 20/00
 372/50.1
6,940,885 B1 9/2005 Cheng et al.
(Continued)

FOREIGN PATENT DOCUMENTS

DE 102018123320 A1 3/2020

OTHER PUBLICATIONS

Riechel, Stefan (EP Authorized Officer), International Search Report and Written Opinion (with English Translation) In corresponding International Application No. PCT/EP2021/061694 mailed on Oct. 4, 2021, 20 pages.

*Primary Examiner* — Yuanda Zhang
(74) *Attorney, Agent, or Firm* — MH2 Technology Law Group LLP

(57) ABSTRACT

A semiconductor laser includes a horizontal laser element including a first semiconductor layer arrangement having a first active zone for generating radiation. The horizontal laser element furthermore includes a first optical resonator extending in a direction parallel to a first main surface of the first semiconductor layer arrangement. Lateral boundaries of the first semiconductor layer arrangement run obliquely, such that electromagnetic radiation generated is reflectable (Continued)

in a direction of the first main surface of the first semiconductor layer arrangement. The semiconductor laser furthermore includes a vertical laser element having a second optical resonator extending in a direction perpendicular to the first main surface of the first semiconductor layer arrangement. The vertical laser element is arranged above the first semiconductor layer arrangement on the side of the first main surface in a beam path of electromagnetic radiation reflected at one of the lateral boundaries of the first semiconductor layer arrangement (112).

15 Claims, 16 Drawing Sheets

(51) Int. Cl.
H01S 5/026 (2006.01)
H01S 5/10 (2021.01)
H01S 5/183 (2006.01)
H01S 5/185 (2021.01)
H01S 5/343 (2006.01)
H01S 5/42 (2006.01)
G01S 7/481 (2006.01)

(52) U.S. Cl.
CPC .......... *H01S 5/18305* (2013.01); *H01S 5/185* (2021.01); *H01S 5/3432* (2013.01); *H01S 5/34326* (2013.01); *H01S 5/423* (2013.01); *G01S 7/4814* (2013.01)

(56) References Cited

U.S. PATENT DOCUMENTS

| 2001/0021214 | A1 | 9/2001 | Jiang et al. |
| 2003/0103534 | A1 | 6/2003 | Braiman et al. |
| 2009/0097519 | A1* | 4/2009 | Brick ............... H01S 5/185 |
| | | | 372/44.01 |
| 2010/0316076 | A1* | 12/2010 | Behfar ............... H01S 5/18 |
| | | | 372/45.01 |

* cited by examiner

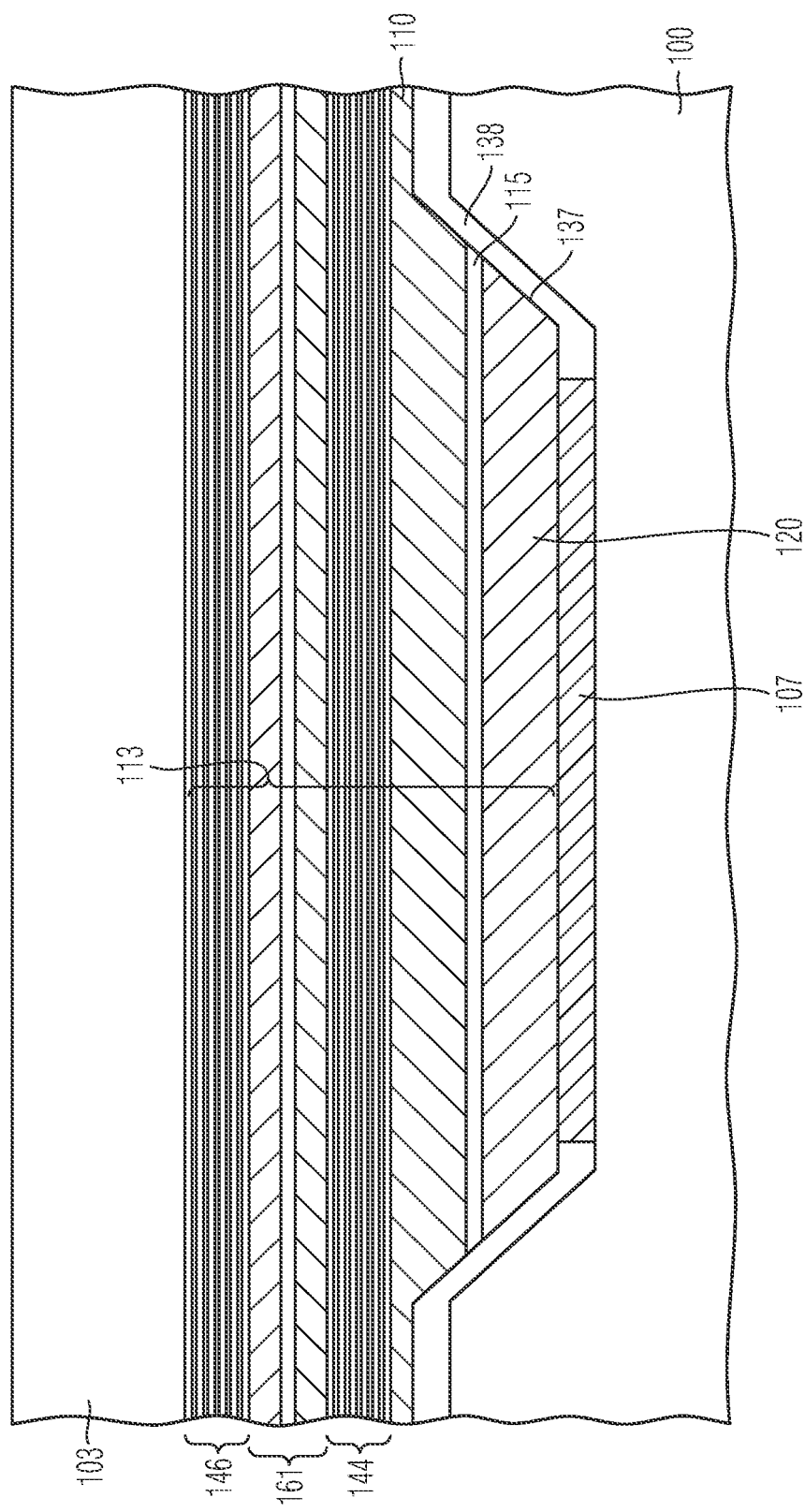

SEMICONDUCTOR LASER WITH A HORIZONTAL LASER ELEMENT AND A VERTICAL LASER ELEMENT, LIDAR SYSTEM AND PRODUCTION METHOD

CROSS-REFERENCE TO RELATED APPLICATIONS

The present application is a national stage entry from International Application No. PCT/EP2021/061694, filed on May 4, 2021, published as International Publication No. WO 2021/239407 A1 on Dec. 2, 2021, and claims priority to German patent application DE 10 2020 206 580.2, filed May 26, 2020, the disclosures of all of which are hereby incorporated by reference herein in their entireties.

BACKGROUND OF THE INVENTION

LIDAR systems are increasingly being used in vehicles, for example for autonomous driving. By way of example, they are used to measure distances or to detect objects. In the case of LIDAR systems, a narrow window for the wavelength used is usually very expedient because in this case a narrowband filter can be used to effectively suppress the sunlight as an interference signal. Since the emission wavelength varies with more than 0.2 nm/K in the case of customary edge emitting semiconductor lasers, concepts are being investigated which involve hardly any variation of the wavelength even at variable temperatures, i.e. in which an increased temperature stability is ensured.

The present invention is based on the object of providing an improved semiconductor laser, an improved LIDAR system and also an improved method for producing a semiconductor laser.

In accordance with embodiments, the object is achieved by means of the subject matter of the independent patent claims. Advantageous further developments are defined in the dependent patent claims.

SUMMARY OF THE INVENTION

A semiconductor laser contains a horizontal laser element comprising a first semiconductor layer arrangement having a first active zone for generating radiation. The horizontal laser element furthermore comprises a first optical resonator extending in a direction parallel to a first main surface of the first semiconductor layer arrangement. Lateral boundaries of the first semiconductor layer arrangement run obliquely, such that electromagnetic radiation generated is reflectable in the direction of the first main surface of the first semiconductor layer arrangement. The semiconductor laser furthermore comprises a vertical laser element having a second optical resonator extending in a direction perpendicular to the first main surface of the first semiconductor layer arrangement. The vertical laser element is arranged at a position above the first semiconductor layer arrangement on the side of the first main surface in a beam path of electromagnetic radiation reflected at one of the lateral boundaries of the first semiconductor layer arrangement.

The semiconductor laser can furthermore have a common contact element, via which the horizontal and vertical laser elements are electrically drivable.

In accordance with embodiments, the semiconductor laser furthermore contains a second vertical laser element arranged at a position above the first semiconductor layer arrangement in the beam path of electromagnetic radiation reflected at another lateral boundary of the first semiconductor layer arrangement.

The semiconductor laser can furthermore contain a wavelength-selective grating structure arranged in the first semiconductor layer arrangement within the first optical resonator.

By way of example, a lateral extent of the vertical laser element in a direction perpendicular to an extension direction of the first optical resonator can be greater than half of the lateral extent of the horizontal laser element in the direction perpendicular to the extension direction of the first optical resonator.

Alternatively, a lateral extent of the vertical laser element in a direction perpendicular to an extension direction of the first optical resonator can be less than half of the lateral extent of the horizontal laser element in the direction perpendicular to the extension direction of the first optical resonator.

In accordance with further embodiments, the semiconductor laser comprises a plurality of vertical lasers above the first main surface in the direction perpendicular to the extension direction of the first optical resonator.

By way of example, the plurality of vertical lasers can be electrically connected in parallel with one another, whereby a parallel circuit is formed. Furthermore, the parallel circuit can be connected in series with the horizontal laser element.

In accordance with embodiments, the vertical laser element and the horizontal laser element can be connected in parallel with one another.

In accordance with further embodiments, the vertical laser element and the horizontal laser element can be connected in series.

Further embodiments relate to a LIDAR system comprising the semiconductor laser as described above.

A method for producing a semiconductor laser comprises forming a horizontal laser element comprising a first semiconductor layer arrangement having a first active zone for generating radiation. Forming the horizontal laser element furthermore comprises forming a first optical resonator extending in a direction parallel to a first main surface of the first semiconductor layer arrangement. Lateral boundaries of the first semiconductor layer arrangement are formed obliquely, such that electromagnetic radiation generated is reflected in the direction of the first main surface of the first semiconductor layer arrangement. The method furthermore comprises forming a vertical laser element comprising a second optical resonator extending in a direction perpendicular to the first main surface of the first semiconductor layer arrangement. The vertical laser element is arranged at a position above the first semiconductor layer arrangement on the side of the first main surface at a position in a beam path of electromagnetic radiation reflected at one of the lateral boundaries of the first semiconductor layer arrangement.

In accordance with embodiments, the horizontal laser element and the vertical laser element are formed by processing a common semiconductor layer arrangement. Alternatively, the horizontal laser element and the vertical laser element can be formed by processing different semiconductor layer arrangements arranged on respectively different substrates.

A method for operating a semiconductor laser as described above comprises applying a first voltage to the horizontal laser element and applying a second voltage to the vertical laser element, wherein the first voltage is greater than $0.9*V_{th1}$ and less than $1.1*V_{th1}$, and the second voltage is greater than $1.5*V_{th2}$, wherein $V_{th1}$ indicates the threshold voltage of the horizontal laser element and $V_{th2}$ indicates the threshold voltage of the vertical laser element.

BRIEF DESCRIPTION OF THE DRAWINGS

The accompanying drawings serve to afford an understanding of exemplary embodiments of the invention. The drawings illustrate exemplary embodiments and together with the description serve to elucidate them. Further exemplary embodiments and numerous advantages from among those intended will become apparent directly from the following detailed description. The elements and structures shown in the drawings are not necessarily illustrated in a manner true to scale with respect to one another. Identical reference signs refer to identical or mutually corresponding elements and structures.

FIGS. 4A to 4G illustrate steps when carrying out a method for producing a semiconductor laser in accordance with embodiments.

DETAILED DESCRIPTION

Figure 1:
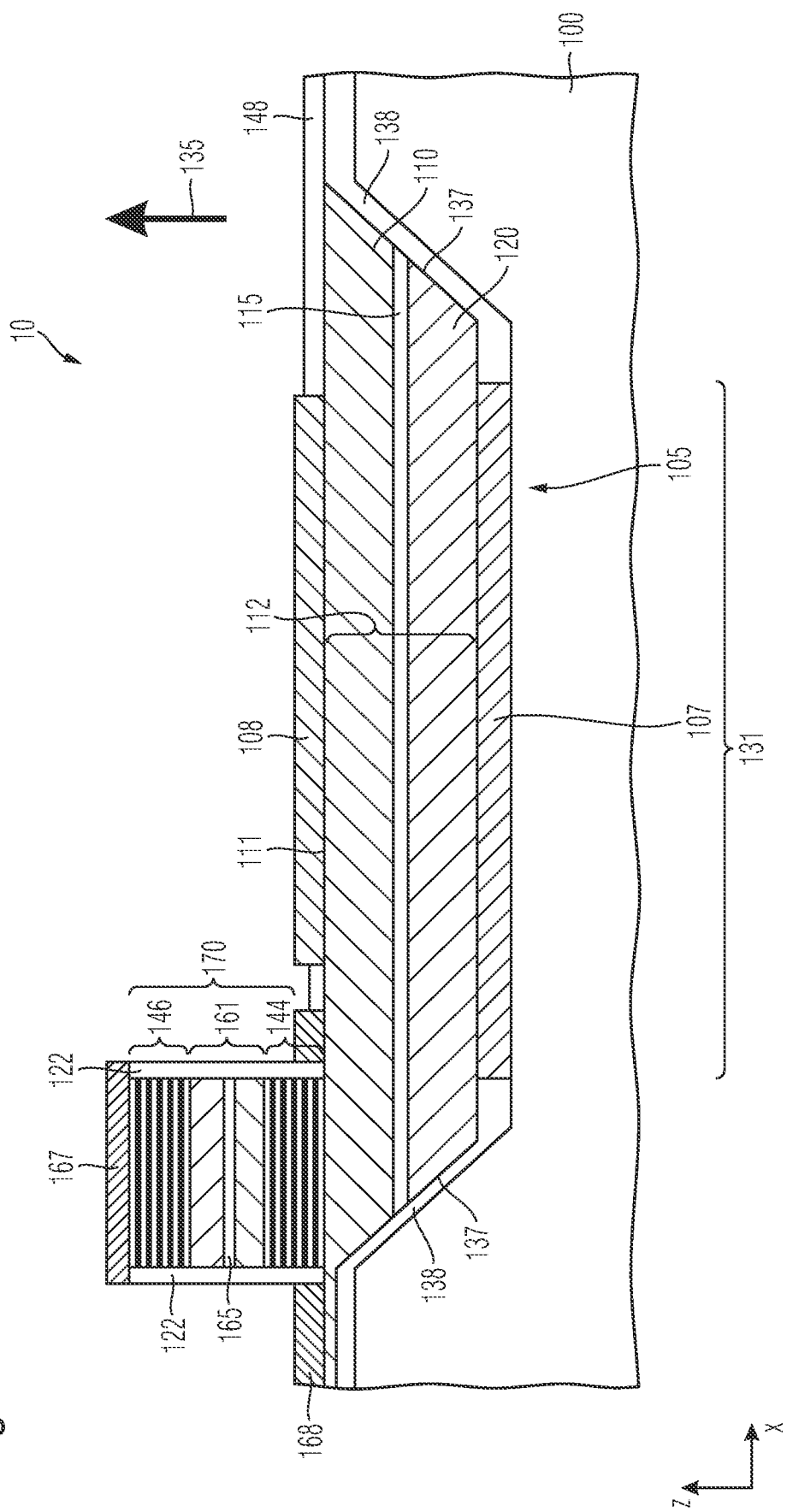
FIG. 1 shows a schematic cross-sectional view of a semiconductor laser in accordance with embodiments.

In the following detailed description, reference is made to the accompanying drawings, which form part of the disclosure and show specific exemplary embodiments for illustration purposes. In this context, a direction terminology such as "top side", "bottom", "front side", "rear side", "over", "on", "in front of", "behind", "at the front", "at the back", etc. relates to the orientation of the figures currently being described. Since the component parts of the exemplary embodiments can be positioned in different orientations, the direction terminology serves only for elucidation and is not restrictive in any way.

The description of the exemplary embodiments is not restrictive since other exemplary embodiments also exist and structural or logical changes can be made, without in that case departing from the scope defined by the patent claims. In particular, elements of exemplary embodiments described below can be combined with elements of other exemplary embodiments from among those described, provided that nothing to the contrary is evident from the context.

The lasers described here are based on semiconductor materials. Generally, the terms "wafer", "semiconductor" or "semiconductor material" used in the following description can encompass any semiconductor-based structure having a semiconductor surface. Wafer and structure should be understood as including doped and undoped semiconductors, epitaxial semiconductor layers, if appropriate carried by a base support, and further semiconductor structures. By way of example, a layer composed of a first semiconductor material can be grown on a growth substrate composed of a second semiconductor material, for example a GaAs substrate, a GaN substrate or an Si substrate, or composed of an insulating material, for example on a sapphire substrate.

Depending on the purpose of use, the semiconductor can be based on a direct or an indirect semiconductor material. Examples of semiconductor materials that are particularly suitable for generating electromagnetic radiation encompass, in particular, nitride semiconductor compounds, which can generate ultraviolet light, blue light or light of longer wavelength, for example, such as GaN, InGaN, AlN, AlGaN, AlGaInN, AlGaInBN, for example, phosphide semiconductor compounds, which can generate green light or light of longer wavelength, for example, such as GaAsP, AlGaInP, GaP, AlGaP, for example, and further semiconductor materials such as GaAs, AlGaAs, InGaAs, AlInGaAs, AlGaAsP, InGaAsP, SiC, ZnSe, ZnO, $Ga_2O_3$, diamond, hexagonal BN and combinations of the materials mentioned. The stoichiometric ratio of the compound semiconductor materials can vary. Further examples of semiconductor materials can encompass silicon, silicon-germanium and germanium. In the context of the present description, the term "semiconductor" also includes organic semiconductor materials.

The term "substrate" generally encompasses insulating, conducting or semiconductor substrates.

The terms "lateral" and "horizontal", as used in this description, are intended to describe an orientation or alignment which extends substantially parallel to a first surface of a substrate or semiconductor body. This can be the surface of a wafer or of a chip (die), for example.

The horizontal direction can lie for example in a plane perpendicular to a growth direction during the growth of layers.

The term "vertical", as used in this description, is intended to describe an orientation which extends substantially perpendicular to the first surface of a substrate or semiconductor body. The vertical direction can correspond for example to a growth direction during the growth of layers.

FIG. 1 shows a cross-sectional view of a semiconductor laser 10 in accordance with embodiments. The semiconductor laser 10 contains a horizontal laser element 105 comprising a first semiconductor layer arrangement 112. The first semiconductor layer arrangement 112 has a first active zone 115 for generating radiation. The horizontal laser element 105 furthermore has a first optical resonator 131 extending in a direction parallel to a first main surface 111 of the semiconductor layer arrangement 112. Lateral boundaries of the first semiconductor layer arrangement 112 run obliquely, such that electromagnetic radiation 125 generated is reflected in the direction of the first main surface 111 of the first semiconductor layer arrangement 112. The semiconductor laser 10 furthermore comprises a vertical laser element 170 having a second optical resonator 161. The second optical resonator 161 extends in a direction perpendicular to the first main surface 111 of the semiconductor layer arrangement 112. In this case, the vertical laser element 170 is arranged at a position in a beam path of electromagnetic radiation reflected at one of the lateral boundaries of the first semiconductor layer arrangement 112. The vertical laser element 170 is arranged above the semiconductor layer arrangement 112 on the side of the first main surface 111. In accordance with embodiments, the semiconductor laser 10 furthermore comprises an output coupling mirror 148 arranged above the first semiconductor layer arrangement 112. The output coupling mirror 148 is arranged for example on the side of the first main surface 111. In accordance with embodiments, it can also be arranged on the opposite side of the semiconductor layer arrangement 112. The output coupling mirror 148 is arranged in the beam path of the electromagnetic radiation which for example has been emitted by the vertical laser element 170 and has passed through the first optical resonator 131 in the x-direction. The electromagnetic radiation 135 has furthermore been reflected at the specularly reflective sidewalls of the first semiconductor layer arrangement 112.

By way of example, the vertical laser element 170 is arranged at a position above the first semiconductor layer arrangement 112 which overlaps the specularly reflective sidewall of the semiconductor layer arrangement 112. By way of example, the output coupling mirror is arranged at a position above the first semiconductor layer arrangement 112 which overlaps the specularly reflective sidewall of the semiconductor layer arrangement 112. The output coupling mirror 148 and the vertical laser element 170 are arranged at opposite sides of the first optical resonator 131.

The first semiconductor layer arrangement 112 comprises for example a first semiconductor layer 110 of a first conductivity type, for example p-conducting, and also a second semiconductor layer 120 of a second conductivity type, for example n-conducting. The active zone 115 for generating radiation is arranged between the first semiconductor layer 110 and the second semiconductor layer 120.

The active zone 115 can have for example a pn junction, a double heterostructure, a single quantum well (SQW) structure or a multi quantum well (MQW) structure for generating radiation. In this case, the designation "quantum well structure" does not exhibit any significance with regard to the dimensionality of the quantization. It therefore encompasses, inter alia, quantum wells, quantum wires and quantum dots and any combination of these layers.

The active zone 115 is provided by a layer or layer sequence whose main surface runs perpendicular to an extension direction of the optical resonator 131. Generally, a semiconductor laser of this type is referred to as an edge emitting semiconductor laser. However, as will also be explained, in accordance with embodiments, the electromagnetic radiation 135 is emitted via a main surface 111 of the semiconductor layer arrangement 112.

The first semiconductor layer arrangement 112 forms a first optical resonator 131 extending in a direction perpendicular to the first main surface 111 of the first semiconductor layer arrangement 112. By way of example, mirrors are in each case arranged above the first main surface 111. Furthermore, the side surfaces of the first semiconductor layer arrangement 112 are beveled, for example at an angle of 45°. A specularly reflective layer, for example a dielectric layer 138, adjoins the beveled side surface. As a consequence, electromagnetic radiation generated in the active zone 115 is reflected at the interface between the sidewall of the first semiconductor layer arrangement 112 and the adjoining dielectric layer 138. The sidewall 137 thus forms a specularly reflective sidewall. The vertical laser element 170 is arranged above the first semiconductor layer arrangement 112. The vertical laser element 170 has for example a first resonator mirror 144, a second resonator mirror 146 and also a second active zone 165 for generating radiation. The active zone 165 is arranged between the first and second resonator mirrors 144, 146.

Electromagnetic radiation generated in the second active zone 165 can be reflected between the first resonator mirror 144 and the second resonator mirror 146 in such a way as to form in the resonator a radiation field 21 for the generation of coherent radiation (laser radiation) by way of induced emission in the active zone. Overall, the distance between the first and second resonator mirrors 115, 120 corresponds to at least half the effective emitted wavelength ($\lambda/2n$, where n corresponds to the refractive index of the active zone), such that standing waves can form within the resonator. The vertical laser element 70 thus forms a so-called VCSEL, i.e. vertical cavity surface emitting laser. The laser radiation generated can be coupled out from the second resonator 170 into the first resonator 131 via the first resonator mirror 144, for example.

In accordance with embodiments, the alternately stacked layers for forming the first and/or second resonator mirror 144, 146 can comprise semiconductor layers, at least one layer of which is doped in each case. By way of example, at least one semiconductor layer of the stacked layers of the first resonator mirror 144 can be doped with a first conductivity type, for example p- or n-type. In a corresponding manner, at least one of the semiconductor layers of the second resonator mirror 146 can be doped with dopants of a second conductivity type, which is different than the first conductivity type, for example n- or p-type.

In accordance with further embodiments, at least the first or the second resonator mirror 144, 146 can be constructed exclusively from dielectric layers. In this case, the layer stack for the second optical resonator 161 additionally has a first semiconductor layer (not shown) of the first conductivity type and also a second semiconductor layer of a second conductivity type (not shown). By way of example, in this case, the alternately arranged dielectric layers can alternately have a high refractive index (n>1.7) and a low refractive index (n<1.7) and be embodied as a Bragg reflector.

By way of example, the semiconductor layers of the first and second resonator mirrors and also of the active zone can be based on the InGaAlP material system and comprise semiconductor layers of the composition $In_xGa_yAl_{1-x-y}P$ where $0 \leq x$, $y \leq 1$ and $x+y \leq 1$.

In accordance with further embodiments, the semiconductor layers of the first and second resonator mirrors and also of the active zone can be based on the AlGaAs layer system and contain in each case layers of the composition $Al_xGa_{1-x}As$, where $0 \leq x \leq 1$.

The cross-sectional view illustrated in FIG. 1 is a vertical cross-sectional view, i.e. a cross-sectional view perpendicular to the growth direction of the semiconductor layers. The growth direction of the semiconductor layers corresponds to the z-direction, and the longitudinal direction of the horizontal laser element 105 corresponds to the x-direction. The first semiconductor layer arrangement 112 can be arranged above a suitable carrier substrate, for example an Si or germanium carrier substrate.

The semiconductor laser furthermore comprises contact elements for applying a voltage to the horizontal laser element 105 and the vertical laser element 170.

By way of example, a first contact element 108 is electrically conductively connected to the first semiconductor layer 110. A second contact element 107 is electrically conductively connected to the second semiconductor layer 120. Furthermore, a first contact element 168 of the vertical laser element 170 can be electrically conductively connected to semiconductor layers of a first conductivity type of the vertical laser element 170. A second contact element 167 of the vertical laser element 170 can be electrically conductively connected to semiconductor layers of the second conductivity type of the vertical laser element 170.

As is illustrated in FIG. 1, the first contact element 168 of the vertical laser element 170 is connected to semiconductor layers of the first conductivity type of the vertical laser element 170 via a part of the first semiconductor layer 110. For this reason, the first semiconductor layer 110 of the horizontal laser element 105 faces a semiconductor layer of the first conductivity type of the vertical laser element 170.

In accordance with further embodiments, the electrical contact between the first contact element 168 of the vertical laser element 170 can also be embodied in a different way, for example via conducting or semiconductor layers which are separated or insulated from the semiconductor layers of the horizontal laser element 105. In this case, it is possible for the conductivity types of the semiconductor layers to be embodied arbitrarily. By way of example, the first semiconductor layer 110 of the horizontal laser element 105 can be arranged on the side facing away from the vertical semiconductor element 170, and a semiconductor layer of the first conductivity type of the vertical semiconductor element 170 is arranged on the side facing the horizontal laser element 105.

By applying a suitable voltage between the first contact element 168 and the second contact element 167, it is possible to generate a stimulated emission in the vertical laser element 170. The horizontal laser element 105 is optically pumped by this stimulated emission of the first vertical laser element 170. By way of example, a first voltage $V_1$ applied to the horizontal laser element 105 can be somewhat greater or somewhat less than the threshold voltage $V_{th1}$ of the horizontal laser element 105. By way of example, the following relationship can hold true: $0.9*V_{th1}<V_1<1.1*V_{th1}$. Furthermore, a second voltage $V_2$ applied to the vertical laser element 170 can be significantly greater than the threshold voltage $V_{th2}$ of the vertical laser element 170. By way of example, the following relationship can hold true: $V_2>V_{th2}$. In this way the vertical laser element 170 acts as a "master laser", and the horizontal laser element 105 acts as a "slave laser". The master laser predefines the emission wavelength of the semiconductor laser, and the slave laser emits with the emission wavelength predefined by the master laser.

On account of the injection locking mechanism, laser radiation having the emission wavelength of the vertical laser element 170 can be generated in the horizontal laser element 105. The electromagnetic radiation 135 emitted by the horizontal laser element 105 is output via the output coupling mirror 148, for example.

In the event of a temperature increase, the band gap of semiconductors usually decreases, caused by intensified interaction of the charge carriers and an altered lattice constant of the semiconductor crystal.

In this case, the degree to which the emission wavelength shifts with temperature is dependent on the emission wavelength or photon energy. By way of example, the following relationship holds true in the case of semiconductor lasers comprising a horizontal resonator for the variation of the band gap or the emission wavelength with temperature in the case of horizontal lasers: dEg/dT=0.4 meV/K. Thus, by way of E=hc/λ, this then results in $d\lambda/dT=-\lambda^2/hc*dEg/dT$.

The material system of the semiconductor laser is selected for example according to the emission wavelength to be achieved. A relationship between the shift in the emission wavelength with temperature and the material system used accordingly arises. This amounts to approximately 0.25 to 0.32 nm/K for emission wavelengths in a range of 900 to 1000 nm. The AlGaInAs material system is usually used for such emission wavelengths. For wavelengths at approximately 400 nm, the degree to which the emission wavelength shifts amounts to 0.05 nm/K. The InAlGaN material system is usually used for such emission wavelengths. For wavelengths at approximately 1250 nm, the degree to which the emission wavelength shifts amounts to 0.5 nm/K. The InAlGaAsP material system is usually used for this wavelength.

Horizontally emitting lasers or VCSELs usually have a significantly smaller wavelength shift with temperature. By way of example, it can lie in a range of 0.07 nm/K. As illustrated in FIG. 1, for example, a vertical laser element 170 is arranged on the HR side, i.e. the side with the mirror having a higher reflectivity than the output coupling mirror 148, of the horizontal laser element 105. As a consequence, the vertical laser element 170 can be used as a so-called master laser in order to force the horizontal laser element 105 and thus the semiconductor laser 10 to a specific wavelength. The light emitted by the vertical laser element 170 couples into the first optical resonator 131 via the obliquely etched facet 137 and is amplified further. A wavelength-stable semiconductor laser having high output power can be achieved in this way.

The polarization direction of the electromagnetic radiation generated by the vertical laser element 170 should correspond to the polarization direction of the electromagnetic radiation generated by the horizontal laser element 105. By way of example, this can be ensured by the elliptic aperture of the vertical laser element 170.

In accordance with embodiments illustrated in FIG. 1, respective first and second contact elements 107, 108 or 168, 167 are provided for the horizontal laser element 105 and for the vertical laser element 170. In accordance with further embodiments, a common contact element 166 can also be provided for the horizontal laser element 105 and the vertical laser element 170.

Figure 2A:
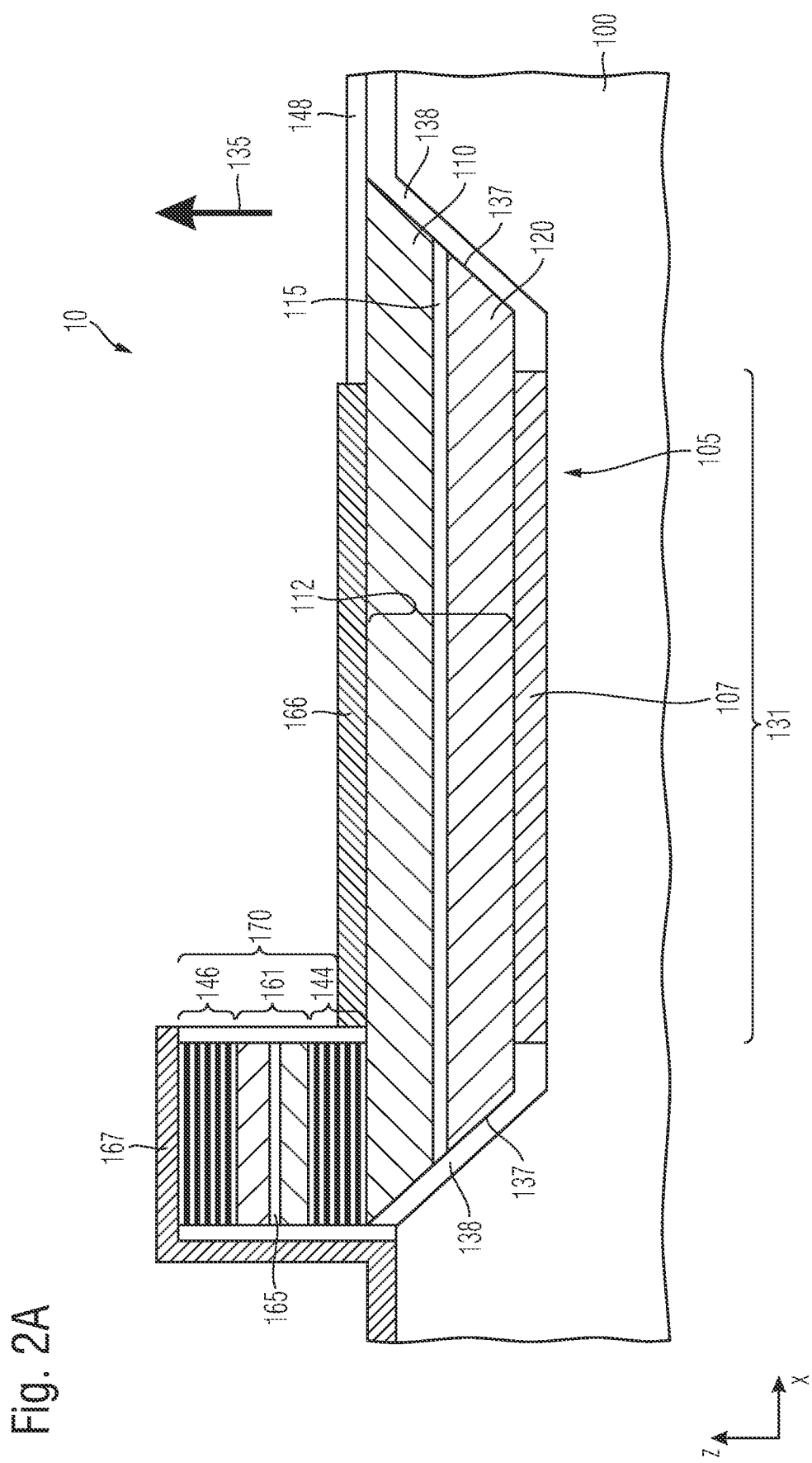
FIG. 2A shows a cross-sectional view of a semiconductor laser in accordance with further embodiments.

FIG. 2A illustrates a cross-sectional view of a semiconductor laser 10 in accordance with embodiments. In a departure from embodiments illustrated with reference to FIG. 1, the horizontal laser element 105 and the vertical laser element 170 are driven via a common contact element 166. By way of example, the first semiconductor layer 110 is electrically conductively connected to the common contact element 166. Furthermore, semiconductor layers of the first conductivity type of the first vertical laser element 170 are likewise electrically conductively connected to the common contact element 166. The second semiconductor layer 120 of the second conductivity type is connected to a second contact element 107 of the horizontal laser element. Semiconductor layers of the second conductivity type of the first vertical laser element 170 are likewise connected to the second contact element 167 of the first vertical laser element.

In accordance with further embodiments, the second semiconductor layer 120 of the second conductivity type can also be connected to the common contact element 166. By way of example, in this case, the common contact element 166 can be connected to a semiconductor layer of the first conductivity type of the vertical laser element 170 via a layer that is insulated from the second semiconductor layer 120.

By way of example, the vertical and horizontal laser elements can also be operated independently of one another when a common contact element is used. In particular, one of the laser elements can be operated in a continuous mode, and another of the laser elements can be operated in a pulsed mode.

In accordance with all of the embodiments described here, the vertical and horizontal laser elements 170, 105 can be connected in parallel with one another, for example. This is illustrated schematically in FIG. 2B.

In accordance with further embodiments, the vertical and horizontal laser elements 170, 165 can be connected in series, for example if the same current intensity flows through each of the vertical and horizontal laser elements. This is illustrated schematically in FIG. 2C.

Figure 2B:
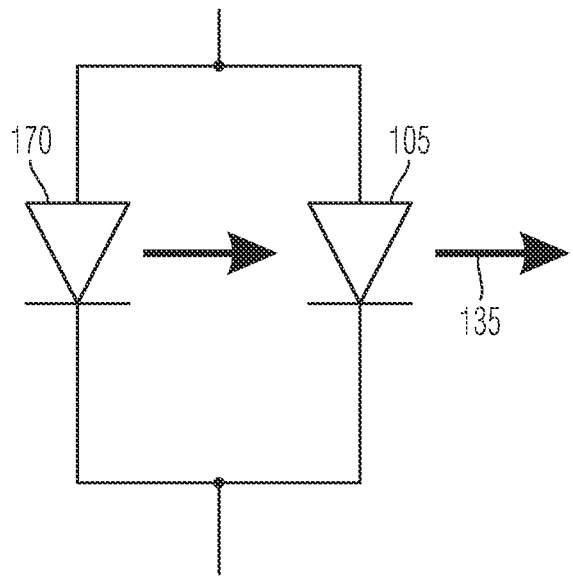
FIG. 2B shows an equivalent circuit diagram of a circuit of the laser elements in accordance with embodiments.
Figure 2C:
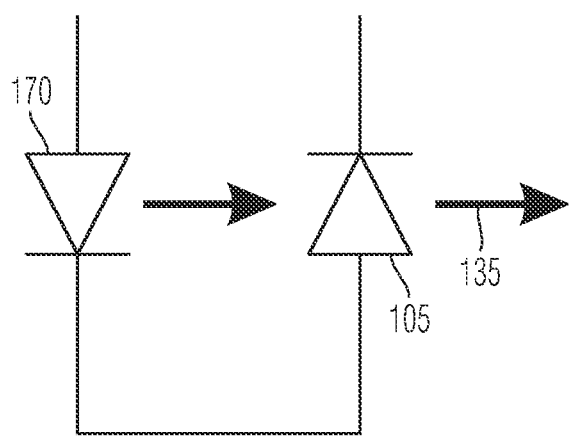
FIG. 2C shows an equivalent circuit diagram of a circuit of the laser elements in accordance with further embodiments.
Figure 2D:
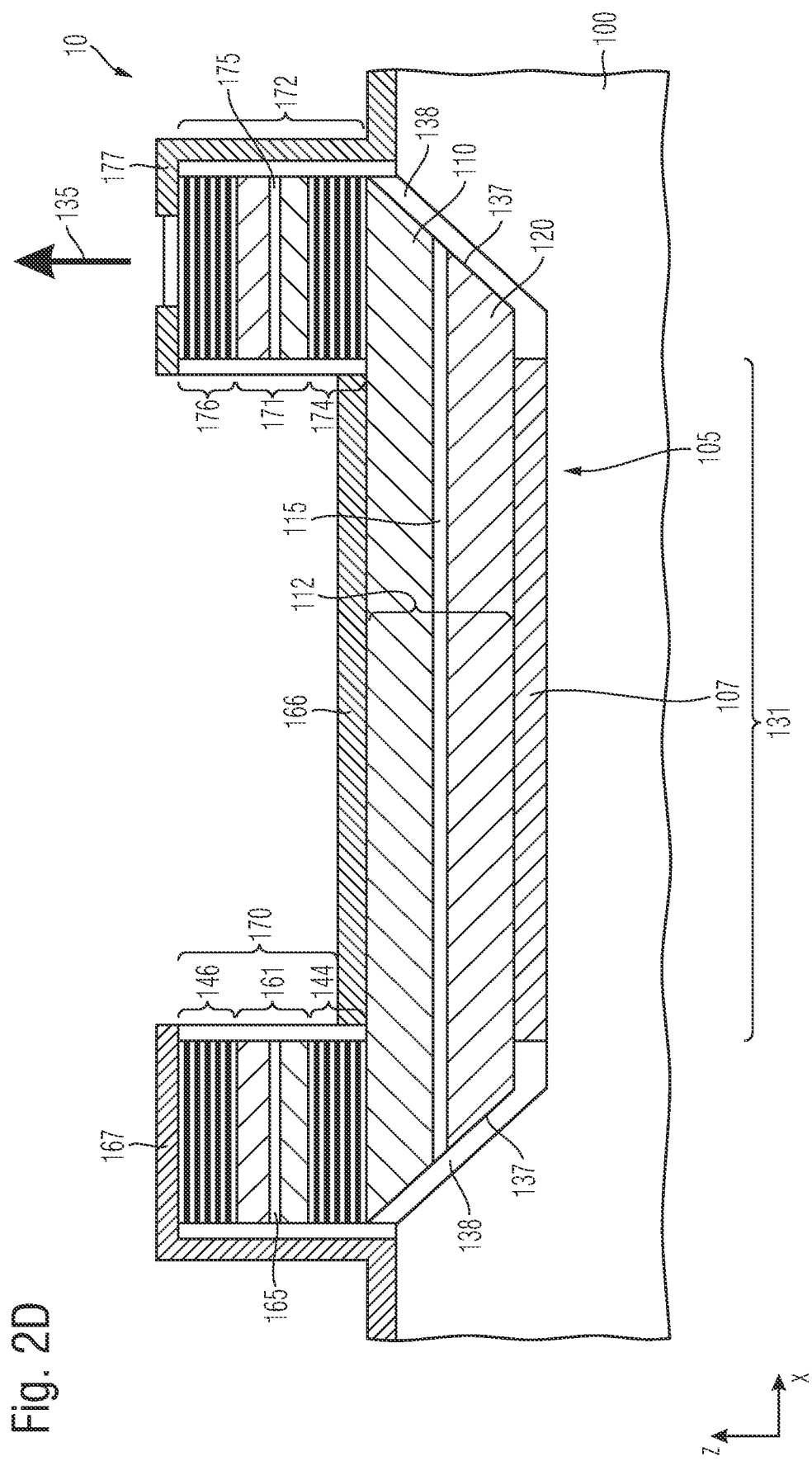
FIG. 2D shows a cross-sectional view of a semiconductor laser in accordance with further embodiments.

In accordance with embodiments illustrated in FIG. 2D, an additional second vertical laser element 172 is arranged at the side of the output coupling mirror 148 illustrated in FIG. 2A. The second vertical laser element 172 is arranged at a position above the first semiconductor layer arrangement 112 which overlaps the specularly reflective sidewall 137 of the semiconductor layer arrangement 112. The first vertical laser element 170 and the second vertical laser element 172 are arranged at respectively opposite sides of the first optical resonator 131.

Here, too, in a manner similar to that in FIG. 2A, a common contact element 166 is electrically conductively connected to a semiconductor layer of the second vertical laser element 172, a semiconductor layer of the first vertical laser element 170 and a semiconductor layer of the horizontal laser element 105. A second contact element 177 of the second vertical laser element 172 is for example electrically conductively connected to second semiconductor layers of the second vertical laser element 172. The construction of the second vertical laser element 172 can be identical to the construction of the first vertical laser element 170. However, an opening can be provided in the second contact element 177 of the second vertical laser element 172. Electromagnetic radiation 135 generated can be coupled out through said opening. Furthermore, a reflectivity of the second resonator mirror 176 of the second vertical laser element can be lower than the reflectivity of the second resonator mirror 146 of the first laser, such that the electromagnetic radiation 135 is coupled out via the second vertical laser element 172.

These measures make it possible to stabilize the emission wavelength further. Furthermore, the output power can be increased by the presence of the second vertical laser element 172.

In accordance with embodiments, in the case of the embodiments illustrated in FIG. 2D, the first and second vertical laser elements 170, 172 and also the horizontal laser element 105 can be driven separately or else using common contact elements, as illustrated in FIG. 2B. By way of example, here the first and second vertical laser elements 170, 172 can be connected in parallel with one another. This is explained in greater detail with reference to FIG. 3D.

Figure 2E:
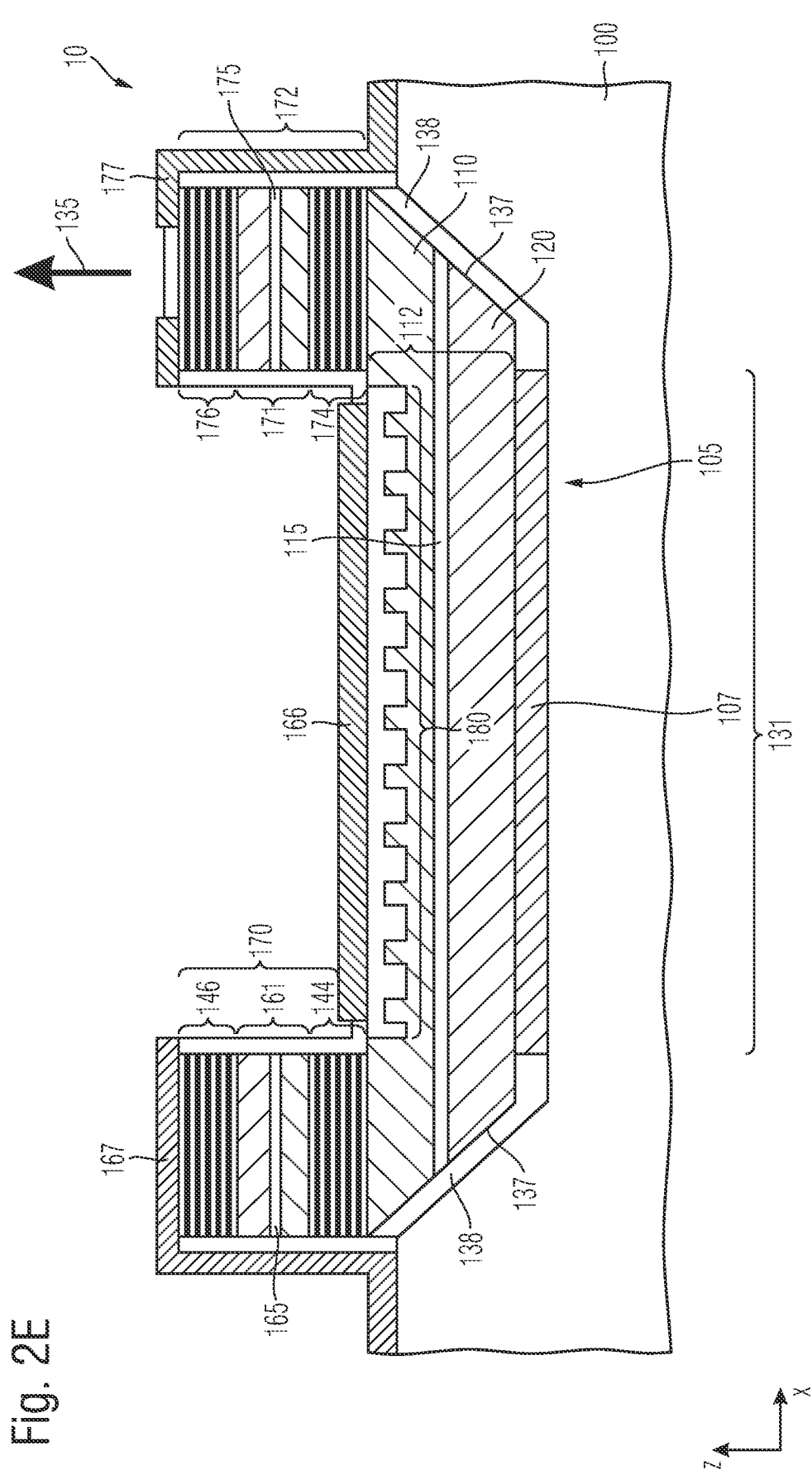
FIG. 2E shows a cross-sectional view of a semiconductor laser in accordance with further embodiments.

FIG. 2E shows embodiments of the semiconductor laser in which provision is additionally made of a grating structure 180, for example a DFB grating ("distributed feedback" grating) or a DBR grating ("distributed Bragg reflector" grating). The grating 180 can be arranged for example in one of the semiconductor layers of the horizontal laser element 105, for example in the second semiconductor layer 120 or the first semiconductor layer 110. The presence of the grating 180 results in an additional temperature stability of the emission wavelength of the semiconductor laser 10.

Figure 3A:
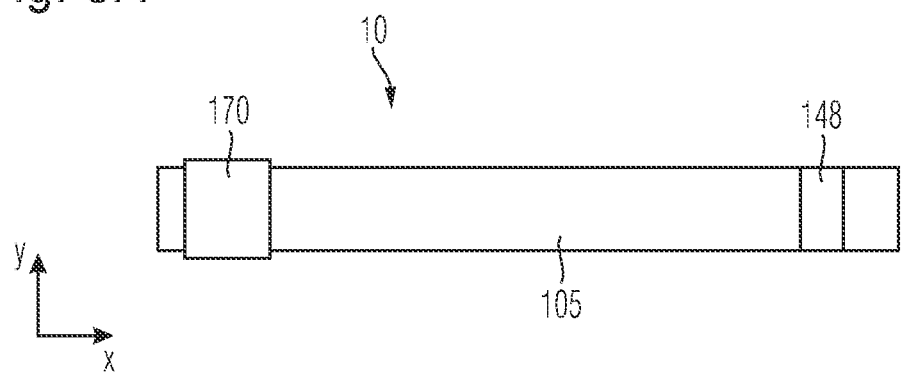
FIG. 3A shows a plan view of a semiconductor laser in accordance with embodiments.

FIG. 3A shows a plan view of the semiconductor laser 10. The plan view in FIG. 3A shows a plan view of the x-y-plane. The horizontal laser element 105 extends in the x-direction and in the y-direction 105. The extension of the optical resonator 131 in the x-direction is greater than the extension in the y-direction. The output coupling mirror 148 is arranged at one end of the horizontal laser element 105 or of the first optical resonator 131. The vertical laser element 170 is situated at the other end of the horizontal laser element 105 or of the first optical resonator 131. In accordance with embodiments shown in FIG. 3A, an extension length of the vertical laser element 170 in the y-direction is of approximately exactly the same magnitude as the extension length of the horizontal laser element 105 in the y-direction. By way of example, a lateral extent of the vertical laser element 170 in the y-direction, i.e. perpendicular to an extension direction of the first optical resonator 131, is greater than half of the lateral extent of the horizontal laser element 105 in the y-direction.

The horizontal laser element 105 shown in FIG. 3A is embodied as a so-called single-mode laser. By way of example, a width measured in the y-direction is approximately more than 3 μm, for example less than 10 μm.

Figure 3B:
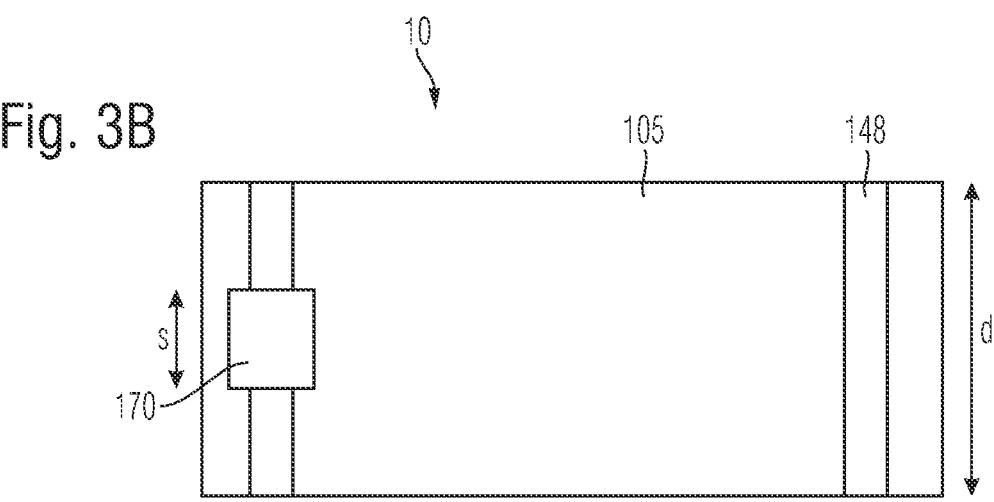
FIG. 3B shows a plan view of a semiconductor laser in accordance with further embodiments.

FIG. 3B shows a plan view of a semiconductor laser 10 in which the horizontal laser element 105 is formed as a so-called broad stripe or multimode laser. A width d in the y-direction can be for example more than 50 or 100 μm, for example at least 150 μm. In FIG. 3B, a width s of the vertical laser element 170 in the y-direction can be significantly less than the width d of the horizontal laser element 105 in the y-direction.

Figure 3C:
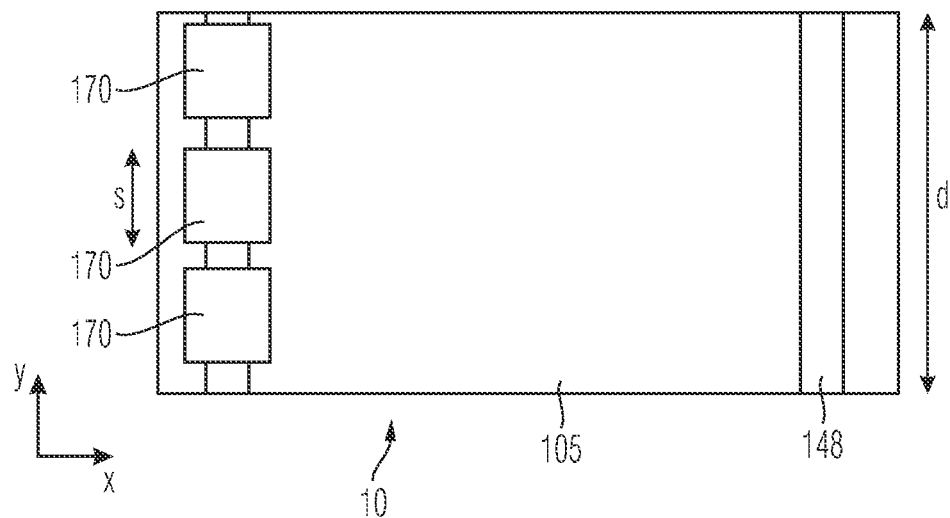
FIG. 3C shows a plan view of a semiconductor laser in accordance with further embodiments.

In accordance with embodiments illustrated in FIG. 3C, a plurality of vertical laser elements 170 can be arranged along the y-direction of the semiconductor laser element 10. In this way, the horizontal laser element 105 can be realized as a broad stripe or multimode laser that is pumpable by a plurality of vertical laser elements 170. The radiation area and the output power of the laser are increased as a result.

The length s of the vertical laser elements 170 in the y-direction is less than the width d of the horizontal laser element 105 in the y-direction. In accordance with embodiments, the vertical laser elements 170 can have a round or else quadrilateral or rectangular aperture. The latter can be set for example in accordance with a polarization direction to be achieved. In accordance with embodiments, for example, the vertical laser element 170 can have an elliptic aperture in each case, such that the polarization of the electromagnetic radiation emitted by the vertical laser element 170 corresponds to the polarization direction of the electromagnetic radiation emitted by the horizontal laser element 105.

As a result, the radiation emitted by the vertical laser element 170 can be efficiently used for pumping the horizontal laser element 105.

Figure 3D:
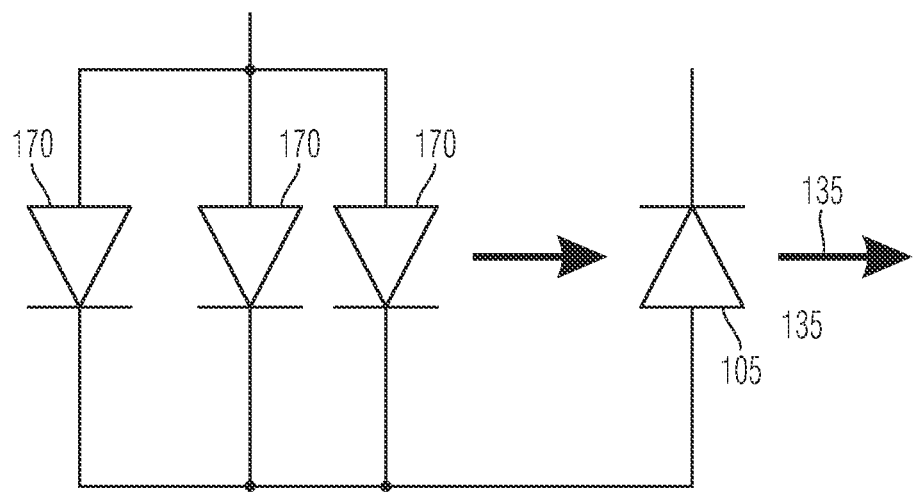
FIG. 3D shows an equivalent circuit diagram of a circuit of the laser elements in accordance with embodiments.

FIG. 3D shows an example in which the vertical laser elements 170, which, as shown in FIG. 3C, are arranged next to one another in the y-direction above the horizontal laser element 105, which constitutes a broad stripe laser, are connected in parallel with one another. The parallel circuit formed by the vertical laser elements 170 can be connected in series with the horizontal laser element 105.

Figure 4A:
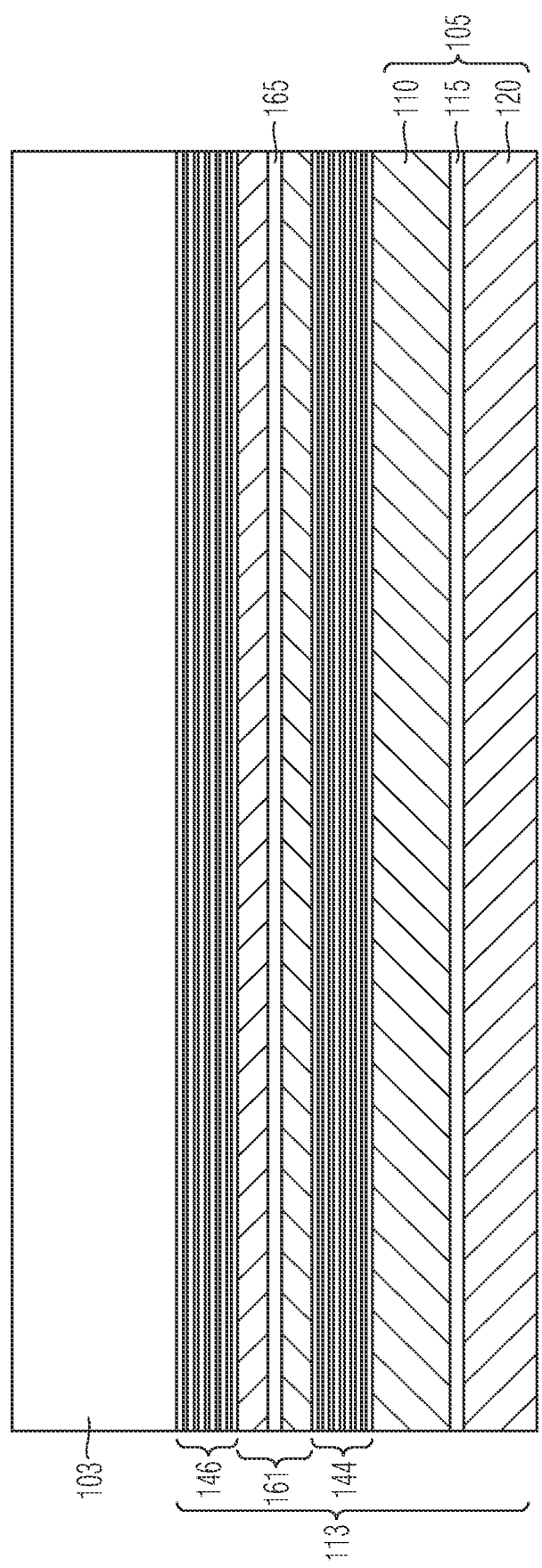

A method for producing a semiconductor laser in accordance with embodiments is described below. As shown in FIG. 4A, a semiconductor layer arrangement 113 for forming both the vertical laser element 107 and the horizontal laser element 105 in accordance with embodiments is grown jointly over a growth substrate 103, for example by way of epitaxial methods. As has been described above, the semiconductor laser can have one or more vertical laser elements, for example. For the sake of simplicity, the method is described for production of two vertical laser elements in the following description. It goes without saying, however, that the method can be modified in a simple manner in order to produce just one or more than 2 vertical laser elements.

By way of example, the substrate 103 can be a sapphire substrate or some other suitable substrate for the growth of optoelectronic semiconductor layers. Firstly the layers for forming the second resonator mirror 146, the optical resonator 161 and the first resonator mirror 144 of the vertical laser elements are formed over the growth substrate 103. These layers can be constructed as explained above. In this case, the layers of the optical resonator 161 of the vertical laser element comprise a layer for forming the active zone 165 of the vertical laser element. The layers for forming the horizontal laser element are then formed. By way of example, firstly a first semiconductor layer 110 of a first conductivity type can be grown, followed by the active zone 115 and the second semiconductor layer 120 of the second conductivity type. However, the layers can also be applied in the opposite order.

As a result, the semiconductor layer stack 113 shown in FIG. 4A can be formed over the growth substrate 103.

Afterward, the semiconductor layer arrangement 113 is etched, for example in order to form reflective sidewalls 137 in the region of the first semiconductor layer 110, the second semiconductor layer 120 and the active zone 115 of the horizontal laser element 105. A dielectric layer 138 can then be deposited on each of the sidewalls 137. A specularly reflective sidewall is formed as a result. Furthermore, in accordance with embodiments, electrically conductive material for forming a second contact element is deposited over the horizontal surface of the exposed layer of the workpiece, for example the second semiconductor layer 120. Furthermore, a new carrier substrate, for example an Si substrate or a Ge substrate, is connected to the exposed surface of the processed semiconductor layer arrangement 113.

FIG. 4B shows a cross-sectional view of one example of a resulting structure. The growth substrate is subsequently removed, for example.

Figure 4C:
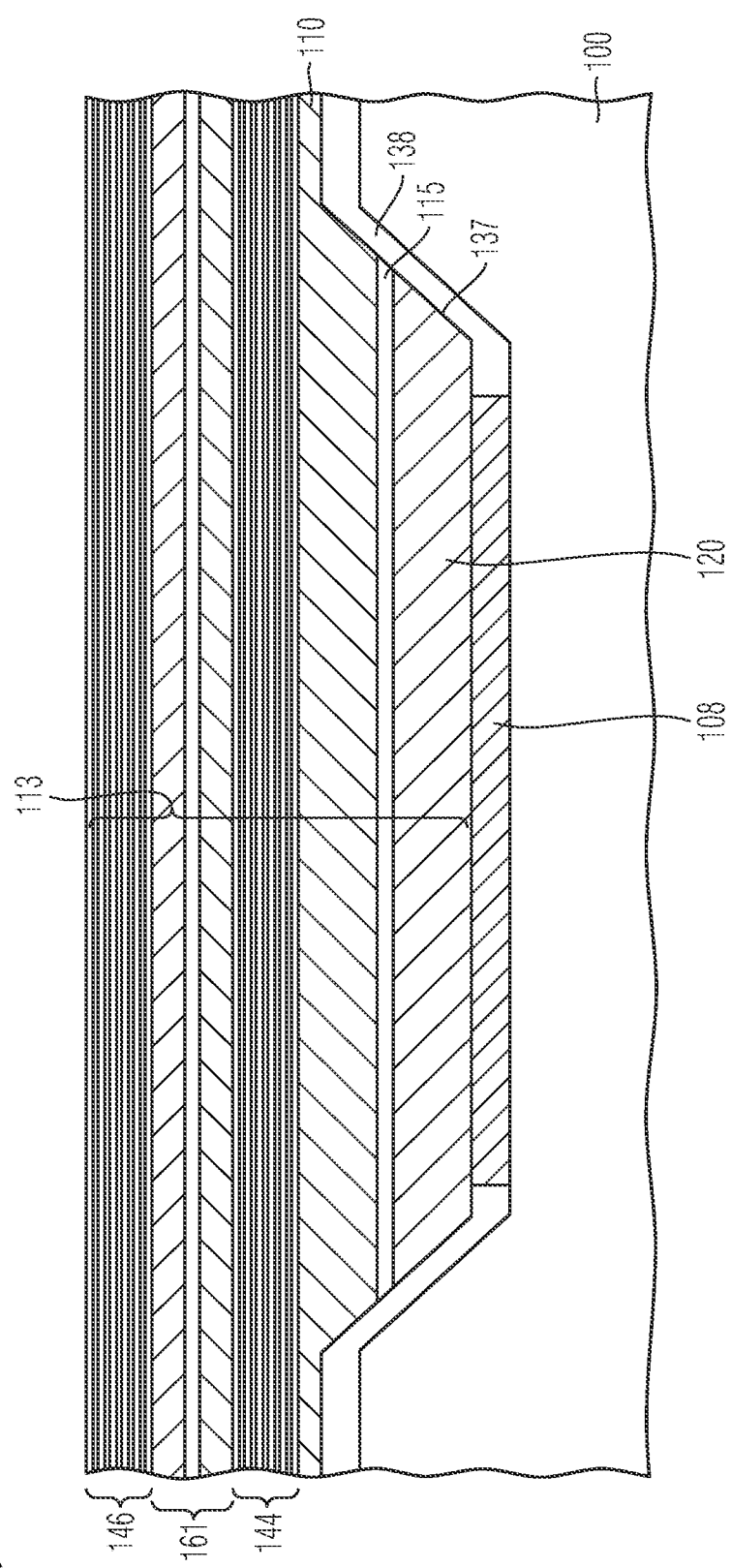

This results for example in the arrangement shown in FIG. 4C. Afterward, the layer stack is etched in order to form the vertical semiconductor laser elements. To put it more precisely, the regions of the layer arrangement 113 are etched, such that the vertical laser elements 170, 172 remain and the rest of the first semiconductor layer 110 is exposed. By way of example, oxidation steps can be carried out in order to oxidize regions of the active zones 165, 175 of the first and optionally the second vertical laser element 170, 172, thereby bringing about current confinement in the corresponding laser element.

Figure 4D:
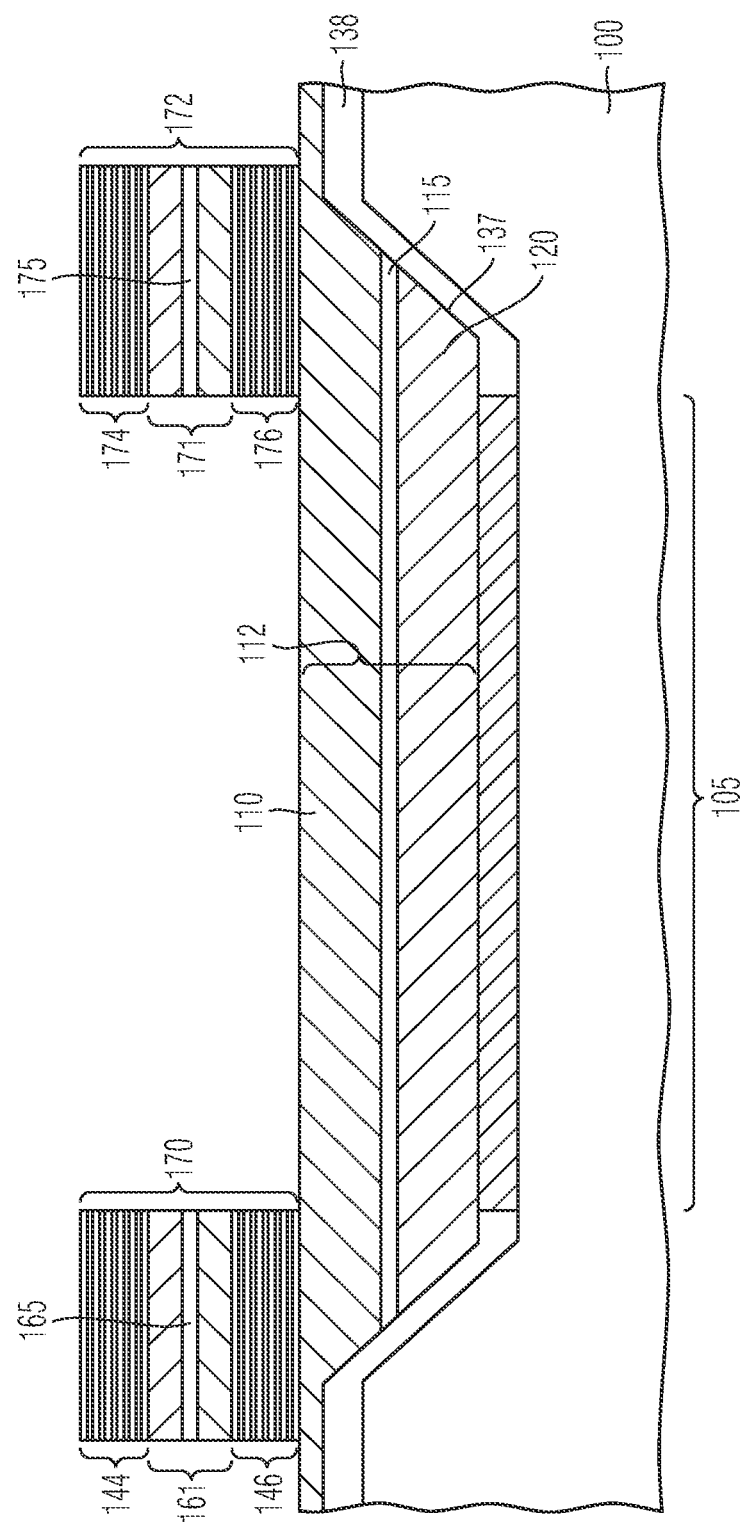

FIG. 4D shows one example of a resulting structure.

A dielectric layer 122, for example, which can contain silicon oxide, silicon nitride or a combination of these materials, for example, is subsequently formed over the whole area of the workpiece.

Figure 4E:
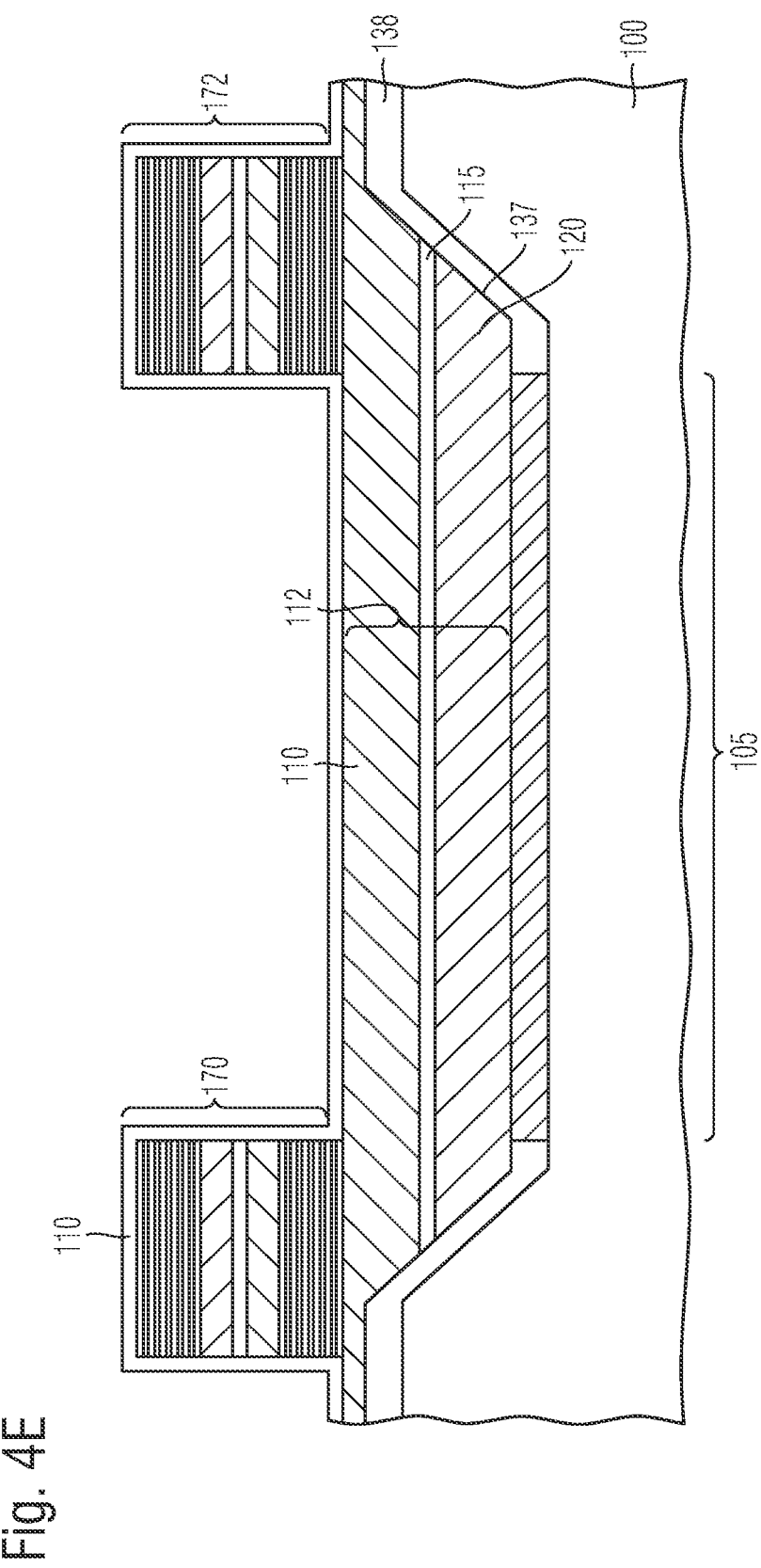

FIG. 4E shows one example of a resulting structure.

Afterward, predetermined regions of the dielectric layer 122 are removed, for example by photolithographic methods, followed by etching methods, in order to provide openings. By way of example, it is possible to produce contacts or connection regions or contact elements in the regions exposed as a result.

Figure 4F:
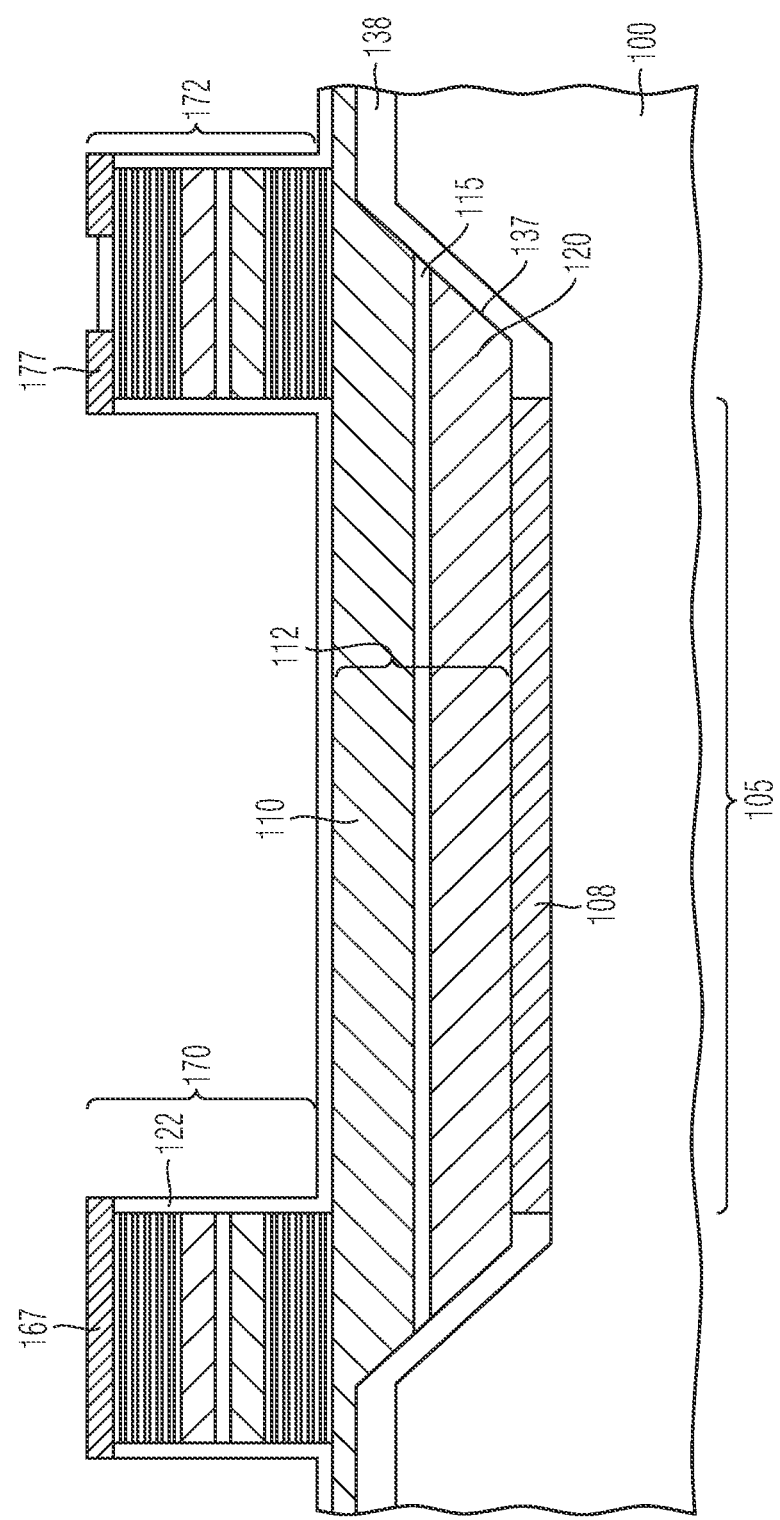

FIG. 4F shows one example of a resulting structure after a metallization has been applied. As is illustrated in FIG. 4F, by way of example, a second contact element 167 can be arranged above the first vertical laser element 170. Furthermore, a second contact element 177 can be arranged above the second vertical laser element 172. By way of example, an opening can be formed in the second contact element 177 for the purpose of coupling out the electromagnetic radiation 135. In accordance with embodiments, it is then possible to remove a horizontal part of the dielectric layer 122 above the first semiconductor layer 110. Here, too, a metallization can subsequently be applied, thereby forming the common contact element 166.

Figure 4G:
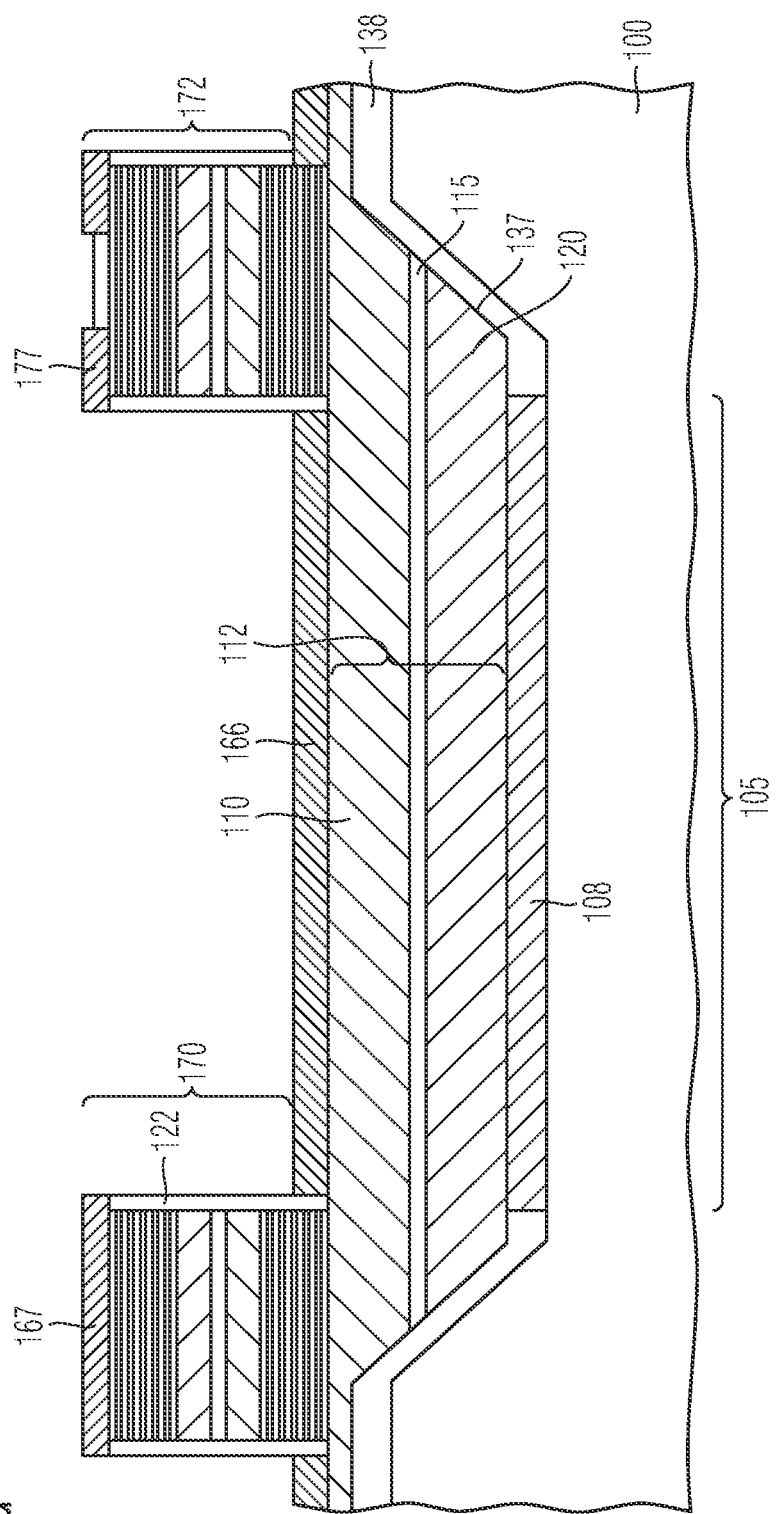

FIG. 4G shows one example of a resulting structure.

As has been described, the semiconductor laser 10 in accordance with embodiments can be produced by processing a semiconductor layer arrangement 113 above a common substrate or carrier substrate.

Figure 5:
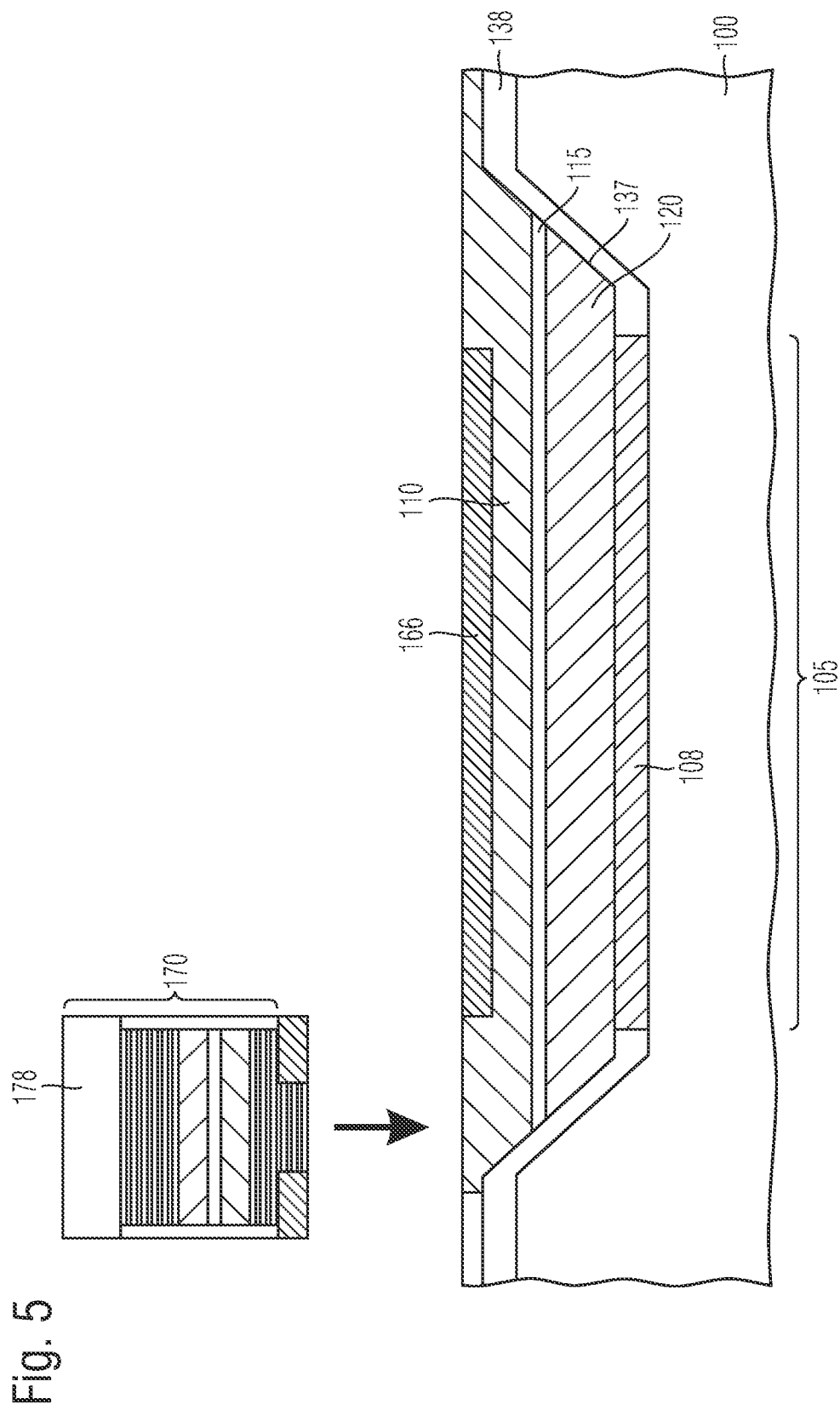
FIG. 5 shows a detail of a method for producing a semiconductor laser in accordance with further embodiments.
Figure 6:
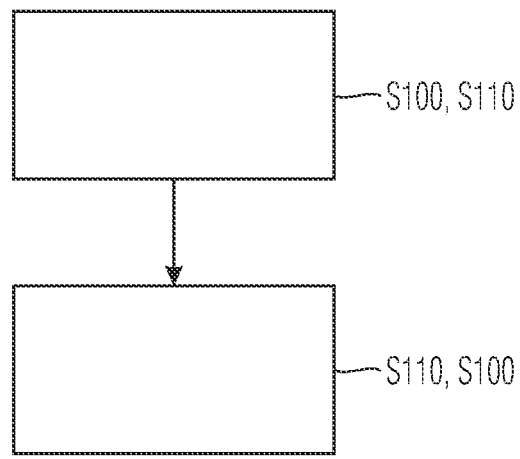
FIG. 6 summarizes a method in accordance with embodiments.

In accordance with further embodiments, it is also possible, as is illustrated in FIG. 5, to produce the vertical laser element 170 and the horizontal laser element 105 by means of separate processing steps on respective separate substrates. By way of example, by modifying the semiconductor layer arrangement 113 illustrated in FIG. 4A, it is possible to provide only the layer construction of the horizontal laser element 105 that is shown in the lower part of FIG. 5. A separate vertical laser element 170 is formed above a substrate 178. Afterward, by means of adhesive bonding, soldering or bonding, for example, the vertical laser element 170 is connected to the lower workpiece shown in FIG. 5.

Figure 7:
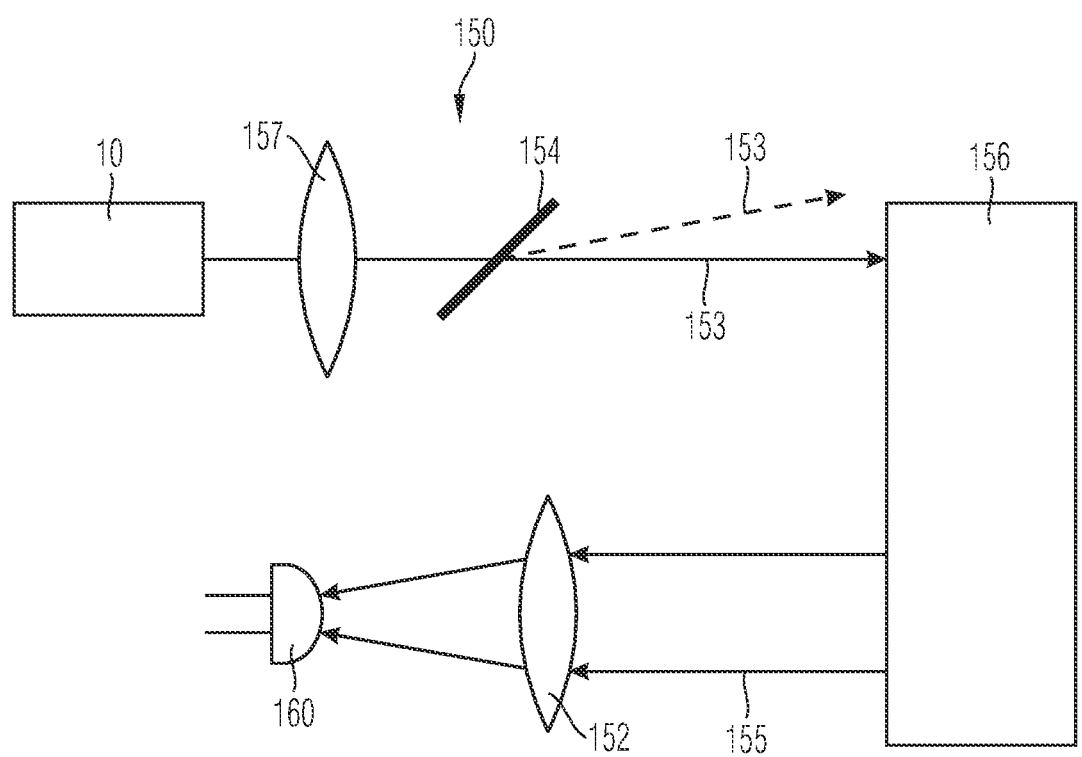
FIG. 7 schematically illustrates the set-up of a LIDAR system in accordance with embodiments.

FIG. 7 summarizes a method in accordance with embodiments. A method for producing a semiconductor laser comprises forming S100 a horizontal laser element comprising a first semiconductor layer arrangement 112 having a first active zone 115 for generating radiation. Forming the horizontal laser element furthermore comprises forming a first optical resonator 131 extending in a direction parallel to a first main surface 111 of the first semiconductor layer arrangement 112. Lateral boundaries of the first semiconductor layer arrangement are formed obliquely, such that electromagnetic radiation 135 generated is reflected in the direction of the first main surface 111 of the first semiconductor layer arrangement 112. The method furthermore comprises forming S110 a vertical laser element having a second optical resonator extending in a direction perpendicular to the first main surface 111 of the first semiconductor layer arrangement 112. The vertical laser element is arranged at a position above the first semiconductor layer arrangement on the side of the first main surface at a position in a beam path of electromagnetic radiation reflected at one of the lateral boundaries of the first semiconductor layer arrangement. The order in which steps S100 and S110 are performed can be as desired.

FIG. 8 shows a LIDAR system in accordance with embodiments. FIG. 10A shows a schematic arrangement of a LIDAR system 150 in which the semiconductor laser 10 described can be used. The, typically pulsed, laser radiation emitted by the semiconductor laser 10 is emitted for example through a collimator optical unit 157 and a deflection/scanning unit 154. The object beam 153 is radiated onto an object 156 and reflected by the latter. The reflected beam 155 arises in this case. The reflected beam 155 is fed to a detector 160 through a receiving optical unit 152. The distance of the object 156 can be determined from the temporal difference between the emission of the laser pulse and the reception of the laser pulse.

By virtue of the fact that the semiconductor laser can be operated at a stable wavelength even at variable temperatures, it is possible to use a narrowband detector. By way of example, the detector can use a narrow wavelength window smaller than 10 nm or 5 nm or even smaller than 1 nm. As a result, the influence of insolation can be reduced and the signal-to-noise ratio can be increased. As a result, lower powers are required from the laser in order to measure the same distances, for example. As a result, the performance of the system is increased overall. Furthermore, the laser can be operated with less power in order to carry out the same measurements with a constant signal-to-noise ratio. As a result, the energy consumption is reduced. Furthermore, the semiconductor laser described can be produced in a simple manner.

Although specific embodiments have been illustrated and described herein, those skilled in the art will recognize that the specific embodiments shown and described can be replaced by a multiplicity of alternative and/or equivalent configurations, without departing from the scope of protection of the invention. The application is intended to cover any adaptations or variations of the specific embodiments discussed herein. Therefore, the invention is restricted only by the claims and the equivalents thereof.

The invention claimed is:

1. A semiconductor laser comprising
a horizontal laser element comprising a first semiconductor layer arrangement having a first active zone for generating radiation,
wherein the horizontal laser element furthermore comprises a first optical resonator extending in a direction parallel to a first main surface of the first semiconductor layer arrangement,
wherein lateral boundaries of the first semiconductor layer arrangement run obliquely, such that electromagnetic radiation generated is reflectable in the direction of the first main surface of the first semiconductor layer arrangement,
a vertical laser element having a second optical resonator extending in a direction perpendicular to the first main surface of the first semiconductor layer arrangement,
wherein the vertical laser element is arranged above the first semiconductor layer arrangement on a first portion of the first main surface in a beam path of electromagnetic radiation reflected at one of the lateral boundaries of the first semiconductor layer arrangement,
an output coupling mirror arranged above the first semiconductor layer on a second portion that is different than the first portion and through which the electromagnetic radiation generated is only emitted through the output coupling mirror, and
contact elements for applying a voltage to the horizontal laser element and the vertical laser element.

2. The semiconductor laser as claimed in claim 1, comprising a common contact element, via which the horizontal and vertical laser elements are electrically drivable.

3. The semiconductor laser as claimed in claim 1, furthermore comprising a second vertical laser element arranged above the first semiconductor layer arrangement in the beam path of electromagnetic radiation reflected at another lateral boundary of the first semiconductor layer arrangement.

4. The semiconductor laser as claimed in claim 1, furthermore comprising a wavelength-selective grating arranged in the first semiconductor layer arrangement within the first optical resonator.

5. The semiconductor laser as claimed in claim 1, wherein a lateral extent of the vertical laser element in a direction perpendicular to an extension direction of the first optical resonator is greater than half of the lateral extent of the horizontal laser element in the direction perpendicular to the extension direction of the first optical resonator.

6. The semiconductor laser as claimed in claim 1, wherein a lateral extent of the vertical laser element in a direction perpendicular to an extension direction of the first optical resonator is less than half of the lateral extent of the horizontal laser element in the direction perpendicular to the extension direction of the first optical resonator.

7. The semiconductor laser as claimed in claim 6, which has a plurality of vertical laser elements above the first main surface in the direction perpendicular to the extension direction of the first optical resonator.

8. The semiconductor laser as claimed in claim 7, wherein the plurality of vertical lasers are electrically connected in parallel with one another, whereby a parallel circuit is formed.

9. The semiconductor laser as claimed in claim 8, wherein the parallel circuit is connected in series with the horizontal laser element.

10. The semiconductor laser as claimed in claim 1, wherein the vertical laser element and the horizontal laser element are connected in parallel with one another.

11. A LIDAR system comprising the semiconductor laser as claimed in claim 1.

12. A method for producing a semiconductor laser comprising
forming a horizontal laser element comprising a first semiconductor layer arrangement having a first active zone for generating radiation,
wherein forming the horizontal laser element furthermore comprises forming a first optical resonator extending in a direction parallel to a first main surface of the first semiconductor layer arrangement,
wherein lateral boundaries of the first semiconductor layer arrangement are formed obliquely, such that electromagnetic radiation generated is reflected in the direction of the first main surface of the first semiconductor layer arrangement, and
the method furthermore comprises forming a vertical laser element comprising a second optical resonator extending in a direction perpendicular to the first main surface of the first semiconductor layer arrangement,
wherein the vertical laser element is arranged above the first semiconductor layer arrangement on a first portion of the first main surface in a beam path of electromagnetic radiation reflected at one of the lateral boundaries of the first semiconductor layer arrangement,
the method further comprises forming an output coupling mirror arranged above the first semiconductor layer on a second portion that is different than the first portion and through which the electromagnetic radiation generated is only emitted through the output coupling mirror, and
the method further comprises forming contact elements for applying a voltage to the horizontal laser element and the vertical laser element.

13. The method as claimed in claim 12, wherein the horizontal laser element and the vertical laser element are formed by processing a common semiconductor layer arrangement.

14. The method as claimed in claim 12, wherein the horizontal laser element and the vertical laser element are formed by processing different semiconductor layer arrangements arranged on respectively different substrates.

15. A method for operating a semiconductor laser as claimed in claim 1, comprising applying a first voltage to the horizontal laser element and applying a second voltage to the vertical laser element, wherein the first voltage is greater than $0.9*V_{th1}$ and less than $1.1*V_{th1}$, and the second voltage is greater than $1.5*V_{th2}$, wherein $V_{th1}$ indicates the threshold voltage of the horizontal laser element and $V_{th2}$ indicates the threshold voltage of the vertical laser element.

* * * * *

UNITED STATES PATENT AND TRADEMARK OFFICE
CERTIFICATE OF CORRECTION

PATENT NO. : 12,506,323 B2  
APPLICATION NO. : 17/926876  
DATED : December 23, 2025  
INVENTOR(S) : Bruno Jentzsch et al.

Page 1 of 1

It is certified that error appears in the above-identified patent and that said Letters Patent is hereby corrected as shown below:

On the Title Page

Item (57), In the Abstract, page 2, Line 10: "arrangement (112)." should be -- arrangement. --.

Signed and Sealed this
Tenth Day of February, 2026

John A. Squires
*Director of the United States Patent and Trademark Office*